United States Patent
Yanagisawa et al.

(10) Patent No.: US 10,994,487 B2
(45) Date of Patent: May 4, 2021

(54) THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM

(71) Applicant: FUJI XEROX CO., LTD., Tokyo (JP)

(72) Inventors: Katsuhiko Yanagisawa, Kanagawa (JP); Naoki Hiji, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 23 days.

(21) Appl. No.: 16/285,235

(22) Filed: Feb. 26, 2019

(65) Prior Publication Data

US 2020/0079021 A1 Mar. 12, 2020

(30) Foreign Application Priority Data

Sep. 6, 2018 (JP) .............................. JP2018-166728

(51) Int. Cl.
| | | |
|---|---|---|
| B29C 64/386 | (2017.01) | |
| B29C 64/118 | (2017.01) | |
| B29C 64/188 | (2017.01) | |
| B33Y 50/00 | (2015.01) | |
| B33Y 50/02 | (2015.01) | |

(52) U.S. Cl.
CPC .......... *B29C 64/386* (2017.08); *B29C 64/118* (2017.08); *B29C 64/188* (2017.08); *B33Y 50/00* (2014.12); *B33Y 50/02* (2014.12)

(58) Field of Classification Search
CPC .... B29C 64/386; B29C 64/188; B29C 64/118
USPC .......................................................... 700/98
See application file for complete search history.

(56) References Cited

U.S. PATENT DOCUMENTS

| | | | |
|---|---|---|---|
| 9,600,929 B1* | 3/2017 | Young | G06T 1/60 |
| 9,999,509 B2 | 6/2018 | Dikovsky et al. | |
| 2010/0171740 A1* | 7/2010 | Andersen | G06T 7/11 345/424 |
| 2013/0172739 A1* | 7/2013 | Paladini | A61B 6/5247 600/436 |
| 2016/0337549 A1* | 11/2016 | Nuuja | H04N 1/32293 |
| 2018/0144539 A1* | 5/2018 | Kredi | G06T 15/08 |
| 2018/0263783 A1 | 9/2018 | Dikovsky et al. | |
| 2019/0056716 A1* | 2/2019 | Ge | B29C 64/386 |
| 2019/0272665 A1* | 9/2019 | X | G06T 15/08 |

FOREIGN PATENT DOCUMENTS

JP 2017222176 12/2017

* cited by examiner

*Primary Examiner* — Jigneshkumar C Patel
(74) *Attorney, Agent, or Firm* — JCIPRNET

(57) ABSTRACT

A three-dimensional object data generation apparatus includes an obtaining unit that obtains three-dimensional object data regarding a three-dimensional object represented by plural first voxels for which a first attribute is set and a replacement unit that, if the first attribute is different from a second attribute achievable by a three-dimensional object forming apparatus that forms the three-dimensional object, replaces each of the plural first voxels with plural second voxels for which the second attribute is set such that the plural second voxels become equivalent to the first voxel.

7 Claims, 5 Drawing Sheets

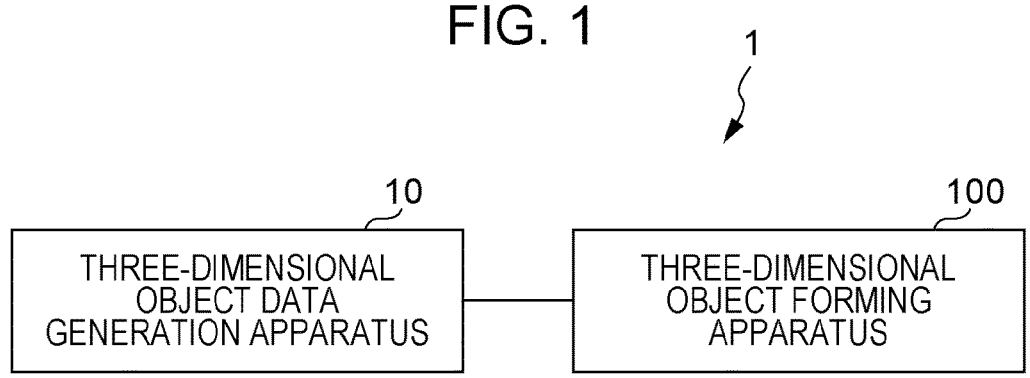
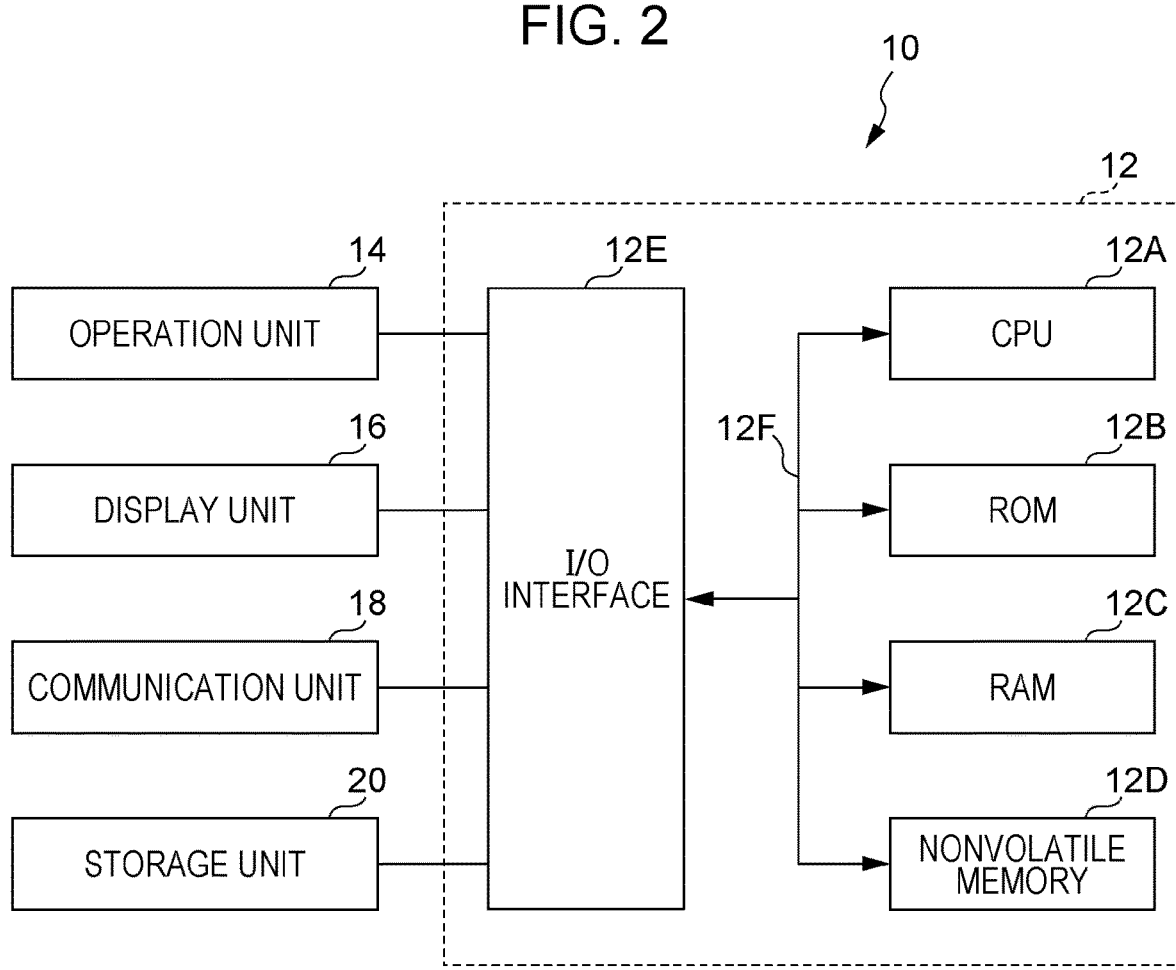

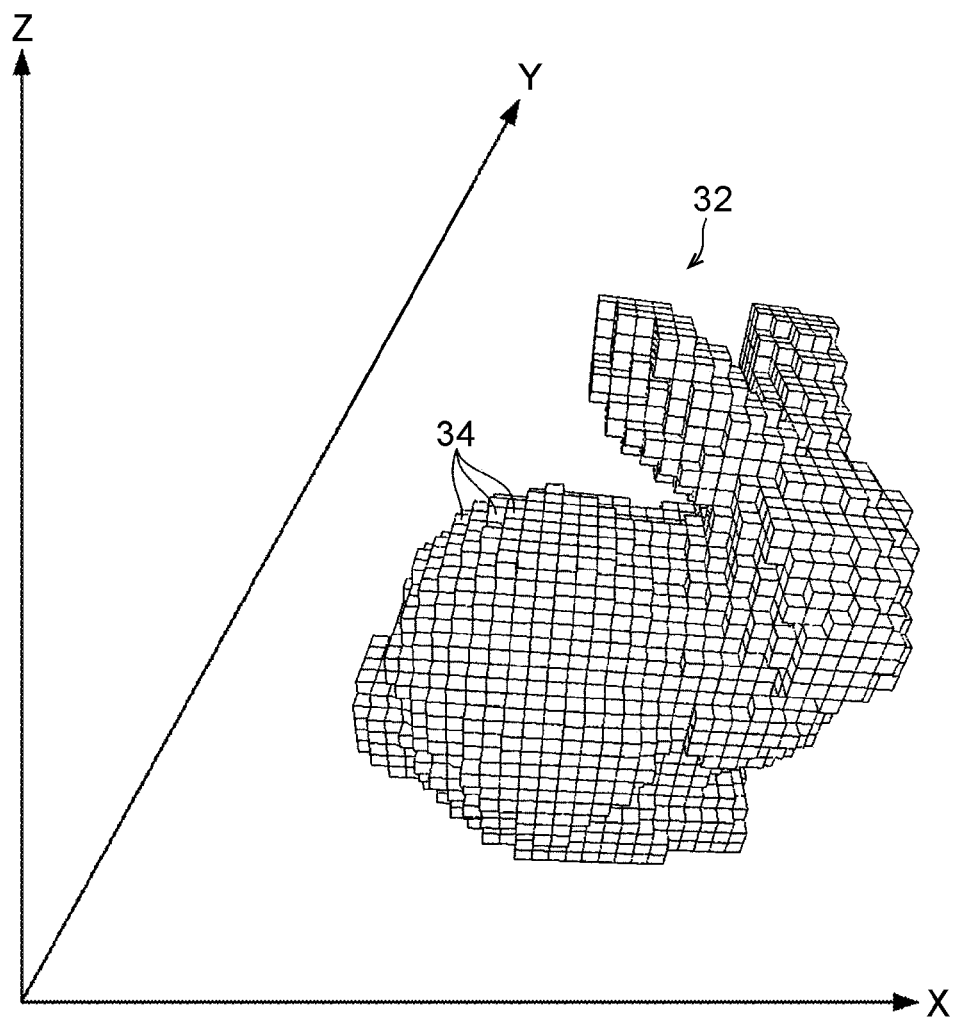

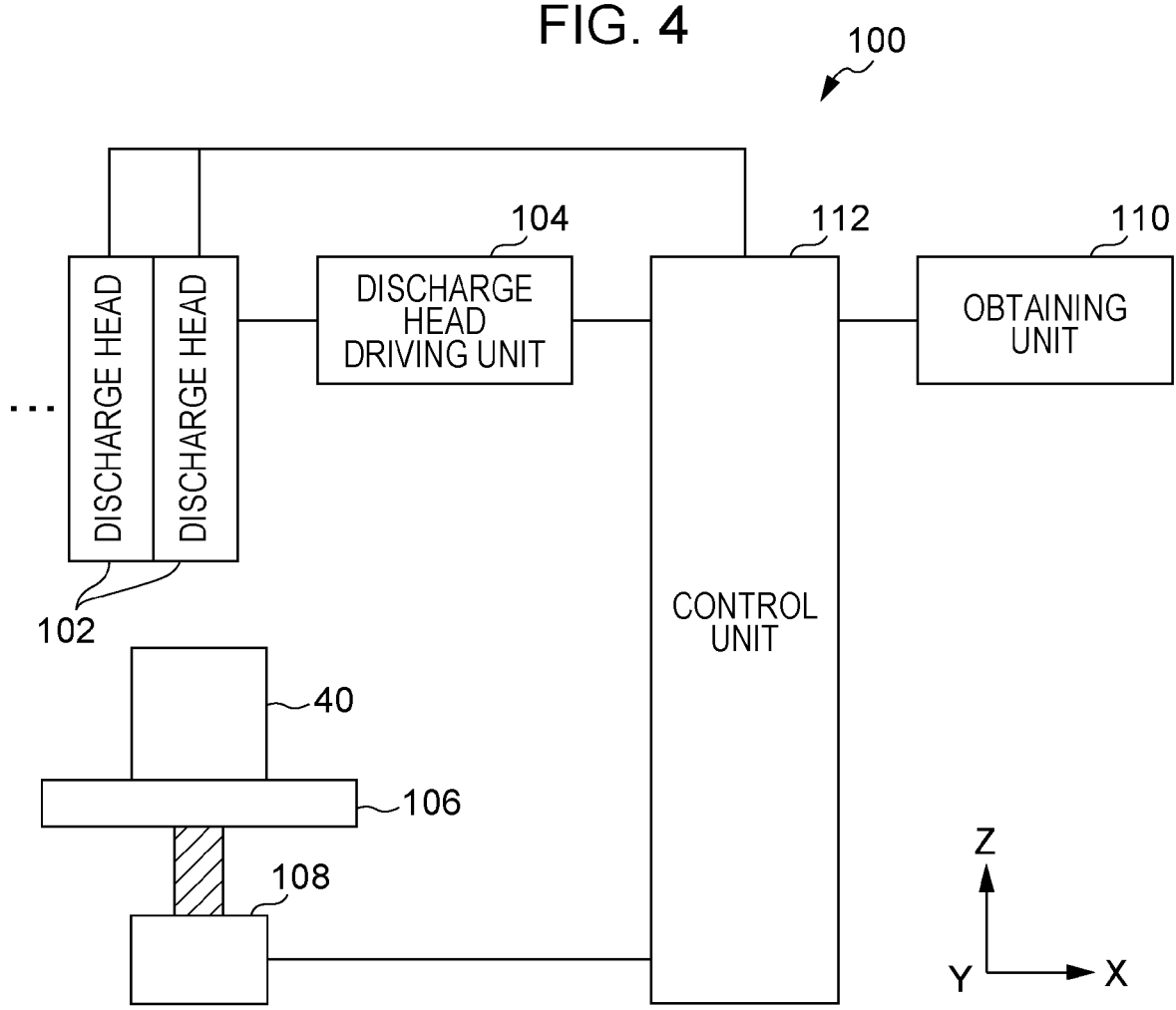

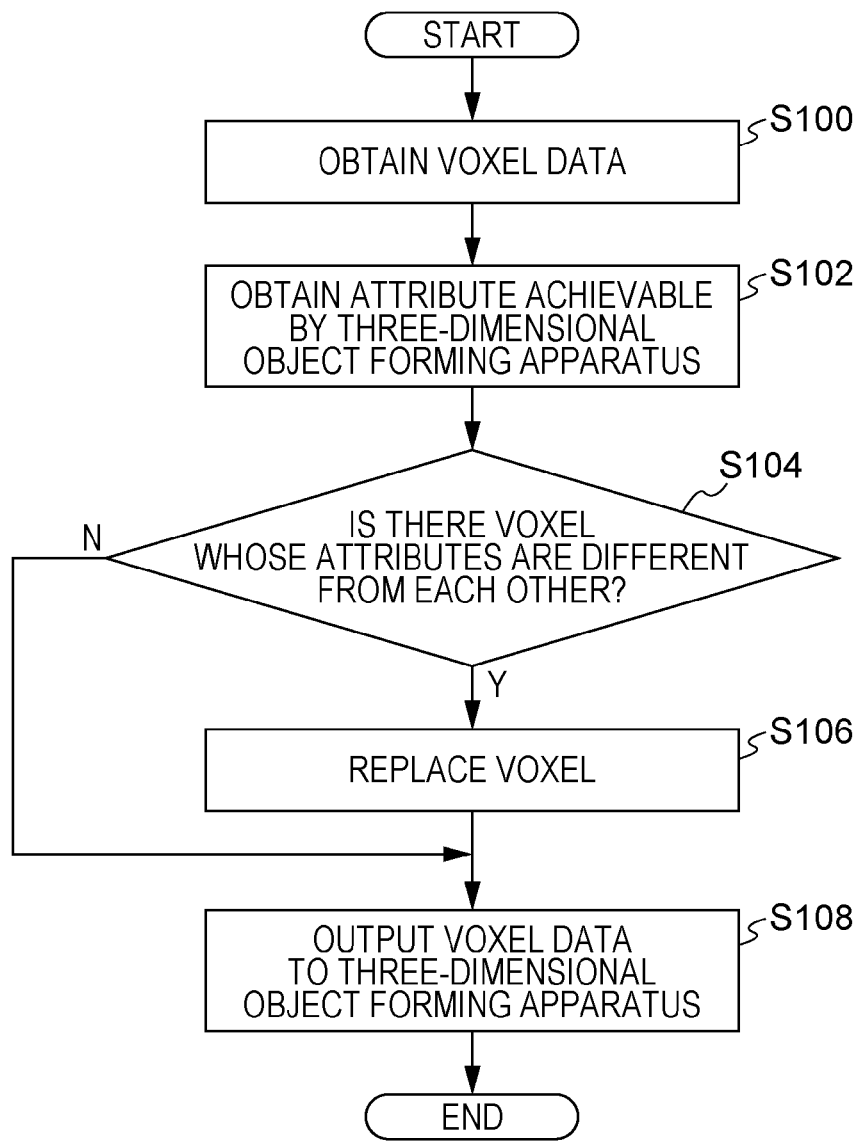

| FIRST ATTRIBUTE | SECOND ATTRIBUTE | STRUCTURE |
|---|---|---|
| A | C, D | STRUCTURE 1 |
| B | E | STRUCTURE 2 |
| : | : | : |

THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-166728 filed Sep. 6, 2018.

BACKGROUND

(i) Technical Field

The present disclosure relates to a three-dimensional object data generation apparatus, a three-dimensional object forming apparatus, and a non-transitory computer readable medium.

(ii) Related Art

Japanese Unexamined Patent Application Publication No. 2017-222176 discloses a physical reconstruction of a body part including a digital material composed of a combination of two modeling materials having different mechanical characteristics obtained through multi-material additive manufacturing. The combination of the two modeling materials is formed in such a way as to imitate mechanical characteristics of the body part in units of voxels, and the voxels are defined on the basis of image data regarding the body part.

SUMMARY

If an attribute (e.g., color) set for voxels representing a three-dimensional object is different from an attribute achievable by a three-dimensional object forming apparatus that forms the three-dimensional object, the three-dimensional object might be formed using an object material having an attribute most similar to the attribute set for the voxels.

Even if the three-dimensional object is formed using the object material having the attribute most similar to the original attribute set for the voxels, however, the attribute might not be equivalent to the original attribute, and a three-dimensional object having a desired attribute might not be formed.

Aspects of non-limiting embodiments of the present disclosure relate to a three-dimensional object data generation apparatus, a three-dimensional object forming apparatus, and a non-transitory computer readable medium capable of forming a three-dimensional object having an attribute equivalent to an original attribute even if an attribute set for voxels representing the three-dimensional object is different from an attribute achievable by a three-dimensional forming apparatus that forms the three-dimensional object.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a three-dimensional object data generation apparatus including an obtaining unit that obtains three-dimensional object data regarding a three-dimensional object represented by a plurality of first voxels for which a first attribute is set and a replacement unit that, if the first attribute is different from a second attribute achievable by a three-dimensional object forming apparatus that forms the three-dimensional object, replaces each of the plurality of first voxels with a plurality of second voxels for which the second attribute is set such that the plurality of second voxels become equivalent to the first voxel.

BRIEF DESCRIPTION OF THE DRAWINGS

An exemplary embodiment of the present disclosure will be described in detail based on the following figures, wherein:

FIG. 1 is a diagram illustrating the configuration of a three-dimensional object forming system;

FIG. 2 is a diagram illustrating the configuration of a three-dimensional object data generation apparatus;

FIG. 3 is a diagram illustrating an example of a three-dimensional object represented by voxel data;

FIG. 4 is a diagram illustrating the configuration of a three-dimensional object forming apparatus;

FIG. 5 is a flowchart illustrating a process achieved by a program for generating three-dimensional object data;

DETAILED DESCRIPTION

Figures 6, 7:
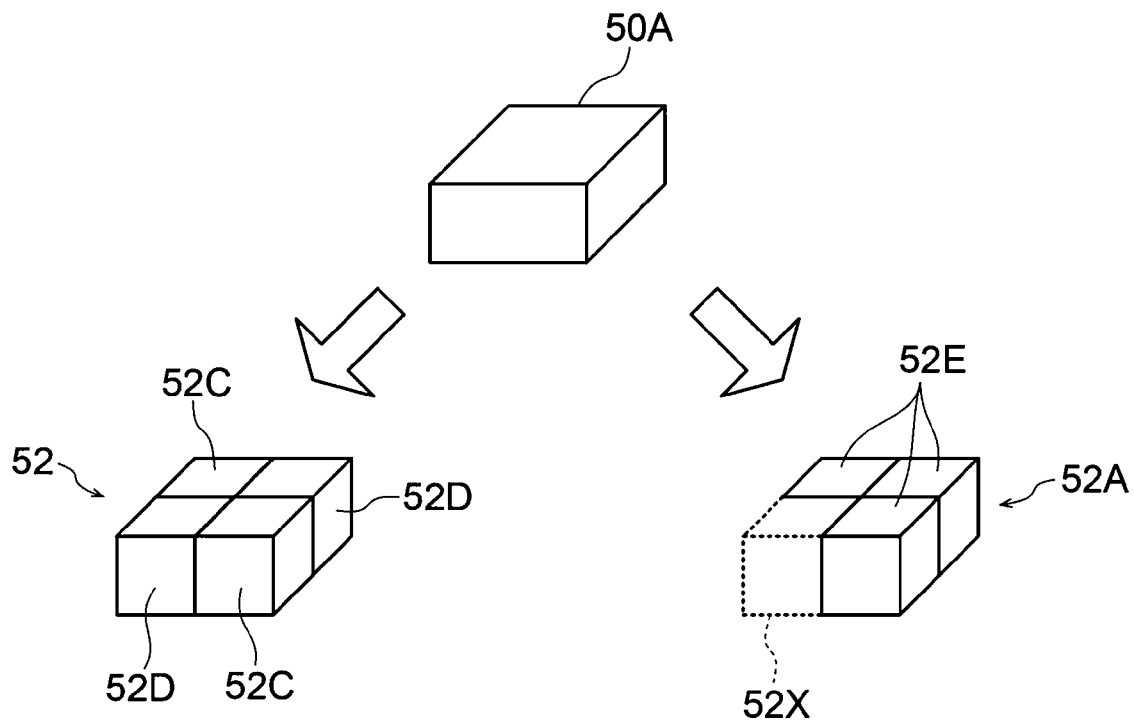
FIG. 6 is a diagram illustrating an example of a replacement table.
FIG. 7 is a diagram illustrating replacement of a voxel.

An exemplary embodiment of the present disclosure will be described in detail hereinafter with reference to the drawings.

FIG. 1 is a diagram illustrating the configuration of a three-dimensional object forming system 1 according to an exemplary embodiment. As illustrated in FIG. 1, the three-dimensional object forming system 1 includes a three-dimensional object data generation apparatus 10 and a three-dimensional object forming apparatus 100.

Next, the configuration of the three-dimensional object data generation apparatus 10 according to the present exemplary embodiment will be described with reference to FIG. 2.

The three-dimensional object data generation apparatus 10 is a personal computer, for example, and includes a controller 12. The controller 12 includes a central processing unit (CPU) 12A, a read-only memory (ROM) 12B, a random-access memory (RAM) 12C, a nonvolatile memory 12D, and an input/output (I/O) interface 12E. The CPU 12A, the ROM 12B, the RAM 12C, the nonvolatile memory 12D, and the I/O interface 12E are connected to one another through a bus 12F.

An operation unit 14, a display unit 16, a communication unit 18, and a storage unit 20 are connected to the I/O interface 12E. The CPU 12A is an example of an obtaining unit and a replacement unit.

The operation unit 14 includes, for example, a mouse and a keyboard.

The display unit 16 is, for example, a liquid crystal display.

The communication unit 18 is an interface for communicating data with external apparatuses.

The storage unit 20 is a nonvolatile storage device such as a hard disk and stores a program for generating three-dimensional object data, which will be described later, three-dimensional object data (voxel data), and the like. The CPU 12A reads the program for generating three-dimensional object data stored in the storage unit 20 and executes the program.

FIG. 3 illustrates a three-dimensional object 32 represented by three-dimensional object data (voxel data), which is a group of voxels. As illustrated in FIG. 3, the three-dimensional object 32 includes a plurality of voxels 34.

The voxels 34 are basic elements of the three-dimensional object 32. The voxels 34 may be rectangular parallelepipeds, for example, but may be spheres or cylinders, instead. A desired three-dimensional object is represented by stacking the voxels 34 on one another.

In the present exemplary embodiment, attributes including at least material or color is set for each voxel.

As a method for forming a three-dimensional object, for example, fused deposition modeling (FDM), in which a thermoplastic resin is plasticized and stacked to form a three-dimensional object, selective laser sintering (SLS), in which a laser beam is radiated onto a powdery metal material to form a three-dimensional object through sintering, or ultraviolet (UV) inkjet printing, in which a UV curable ink is discharged from a nozzle and then UV rays are radiated to cure the ink, is used, but another method may be used, instead. In the present exemplary embodiment, a case where a three-dimensional object is formed using FDM will be described.

Next, a three-dimensional object forming apparatus that forms a three-dimensional object using three-dimensional object data generated by the three-dimensional object data generation apparatus 10 will be described.

FIG. 4 illustrates the configuration of the three-dimensional object forming apparatus 100 according to the present exemplary embodiment. The three-dimensional object forming apparatus 100 forms a three-dimensional object using FDM.

As illustrated in FIG. 4, the three-dimensional object forming apparatus 100 includes discharge heads 102, a discharge head driving unit 104, a stand 106, a stand driving unit 108, an obtaining unit 110, and a control unit 112. The discharge heads 102, the discharge head driving unit 104, the stand 106, and the stand driving unit 108 are an example of a forming unit.

The discharge heads 102 include an object material discharge head that discharges an object material for forming a three-dimensional object 40 and a support material discharge head that discharges a support material. The support material is used to support overhangs (also referred to as "projections") of the three-dimensional object 40 and removed after the three-dimensional object 40 is formed.

The discharge heads 102 are driven by the discharge head driving unit 104 and move on an X-Y plane in two dimensions. The discharge heads 102 include a plurality of object material discharge heads corresponding to object materials of a plurality of attributes. The attributes include at least color or hardness, for example, but are not limited to these.

The stand 106 is driven by the stand driving unit 108 and moves along a Z axis.

The obtaining unit 110 obtains three-dimensional object data and support material data generated by the three-dimensional object data generation apparatus 10.

The control unit 112 drives the discharge head driving unit 104 to move the discharge head 102 in two dimensions and controls the discharge of the object material and the support material performed by the discharge head 102 such that the object material is discharged in accordance with the three-dimensional object data obtained by the obtaining unit 110 and the support material is discharged in accordance with the support material data.

Each time a layer has been formed, the control unit 112 drives the stand driving unit 108 to lower the stand 106 by a predetermined layer interval.

Next, the operation of the three-dimensional object data generation apparatus 10 according to the present exemplary embodiment will be described with reference to FIG. 5. A generation process illustrated in FIG. 5 is performed by causing the CPU 12A to execute a program for generating three-dimensional object data. The generation process illustrated in FIG. 5 is performed, for example, when a user has requested execution of the program. In the present exemplary embodiment, description of a process for generating support material data is omitted.

In step S100, three-dimensional object data regarding a three-dimensional object to be formed represented by a plurality of first voxels for which a first attribute has been set is read, for example, from the storage unit 20. Alternatively, voxel data may be obtained from an external apparatus through the communication unit 18.

In step S102, a second attribute achievable by the three-dimensional object forming apparatus 100 is requested from the three-dimensional object forming apparatus 100. The three-dimensional object forming apparatus 100 transmits the second attribute achievable thereby to the three-dimensional object data generation apparatus 10. As a result, the three-dimensional object data generation apparatus 10 obtains an attribute achievable by the three-dimensional object forming apparatus 100. Although the first and second attributes include at least either color or hardness, a case where the first and second attributes are color will be described hereinafter.

In step S104, whether there is a voxel, which is included in the voxel data obtained in step S100, whose first attribute and second attribute, which has been obtained in step S102 and is achievable by the three-dimensional object forming apparatus 100, are different from each other is determined. If the second attribute achievable by the three-dimensional object forming apparatus 100 is white and black and there is a voxel whose first attribute is gray, for example, a result of the determination made in step S104 becomes positive. If there are only voxels whose first attributes are white or black, on the other hand, the result of the determination made in step S104 becomes negative.

If there is a voxel whose first attribute is different from the second attribute achievable by the three-dimensional object forming apparatus 100, the process proceeds to step S106. If the first attributes of all the voxels are the same as the second attribute, the process proceeds to step S108.

In step S106, if the first attribute is different from the second attribute achievable by the three-dimensional object forming apparatus 100, each of the first voxels are replaced by a plurality of second voxels for which the second attribute is set such that the second voxels become equivalent to the first voxel. The second voxels equivalent to each of the first voxels have an attribute substantially the same as the attribute of the first voxel or attributes within an allowable range from the attribute of the first voxel.

More specifically, each of the first voxels is replaced by second voxels, for example, using a replacement table T illustrated in FIG. 6.

As illustrated in FIG. 6, the replacement table T is table data indicating correspondence between the first attribute, the second attribute, and structure information. The structure information relates to the structure of the second voxels after the replacement. More specifically, the structure information relates to at least the number, the size, or the arrangement of second voxels.

As illustrated in FIG. 6, for example, in a first row of the replacement table T, second attributes "C" and "D" are associated with a first attribute "A". In this case, as illustrated in FIG. 7, a first voxel 50A for which the first attribute "A" is set is replaced by second voxels 52C and 52D for which the second attributes "C" and "D", respectively, are set.

In addition, as illustrated in FIG. 6, "structure 1" is associated with the first attribute "A" as structure information. "Structure 1" is information indicating, as illustrated in FIG. 7, for example, that the total number of second voxels 52C and 52D that replace the first voxel 50A is 4, that the size of the second voxels 52C and 52D is one-quarter that of the first voxel 50A, and that the second voxels 52C and 52D for which the plurality of different second attributes are set are evenly arranged.

As a result, as illustrated in FIG. 7, the first voxel 50A is replaced by a voxel group 52 including two second voxels 52C, whose second attribute is "C", and two second voxels 52D, whose second attribute is "D". The size of the voxel group 52 is the same as that of the first voxel 50A. The size of the three-dimensional object thus remains the same before and after the replacement.

If the first attribute "A" is gray, the second attribute "C" is black, and the second attribute "D" is white, for example, the voxel group 52 becomes equivalent to the first voxel 50A by replacing the first voxel 50A with the voxel group 52 including the second voxels 52C and 52D on the basis of the structure information "structure 1".

In another example, in a second row of the replacement table T, a second attribute "E" is associated with a first attribute "B". "Structure 2" is also associated with the first attribute "B" as structure information. "Structure 2" is information indicating, as illustrated in FIG. 7, for example, that the number of second voxels 52E after replacement is 3, that the size of the second voxels 52E is one-quarter the size of the first voxel 50A, and that an empty voxel 52X whose size is one-quarter that of the first voxel 50A is included. As a result, as illustrated in FIG. 7, the first voxel 50A is replaced by a voxel group 52A including three second voxels 52E whose second attribute is "E" and one empty voxel 52X. The size of the voxel group 52A is the same as that of the first voxel 50A. The size of the three-dimensional object thus remains the same before and after the replacement.

If the first attribute "B" is gray and the second attribute "E" is black, for example, the voxel group 52A becomes equivalent to the first voxel 50A by replacing the first voxel 50A with the voxel group 52A including the second voxels 52E and the empty voxel 52X on the basis of the structure information "structure 2".

"Structure 1" and "structure 2" are examples of the structure information, and the structure information is not limited to these. In step S108, the voxel data whose attributes have been replaced in step S106 is transmitted to the three-dimensional object forming apparatus 100.

The obtaining unit 110 of the three-dimensional object forming apparatus 100 obtains the voxel data transmitted from the three-dimensional object data generation apparatus 10. The control unit 112 drives the discharge head driving unit 104 to move the discharge head 102 in two dimensions and controls the discharge of an object material performed by the discharge head 102 such that the object material is discharged in accordance with the voxel data obtained by the obtaining unit 110. As a result, the three-dimensional object is formed.

As described above, in the present exemplary embodiment, if a first attribute is different from a second attribute achievable by the three-dimensional object forming apparatus 100, a first voxel is replaced by a plurality of second voxels for which the second attribute is set such that the second voxels become equivalent to the first voxel. As a result, even if an attribute set for voxels representing a three-dimensional object is different from an attribute achievable by the three-dimensional object forming apparatus 100 that forms the three-dimensional object, a three-dimensional object having an attribute equivalent to the original attribute is formed.

Although the present disclosure has been described on the basis of the exemplary embodiment, the present disclosure is not limited to the above exemplary embodiment. The exemplary embodiment may be modified or improved without deviating from the spirit of the present disclosure, and the technical scope of the present disclosure includes such modifications and improvements.

Although replacement of voxels when attributes are color has been described in the present exemplary embodiment, a first voxel may be replaced by a plurality of second voxels equivalent thereto, too, when attributes are, for example, hardness.

Although the size of all the second voxels is the same in the example illustrated in FIG. 7, the size of second voxels need not be the same.

Although the three-dimensional object data generation apparatus 10 and the three-dimensional object forming apparatus 100 that forms a three-dimensional object on the basis of three-dimensional object data are separate components in the present exemplary embodiment, the three-dimensional object forming apparatus 100 may have the functions of the three-dimensional object data generation apparatus 10, instead.

That is, the obtaining unit 110 of the three-dimensional object forming apparatus 100 may obtain voxel data, and the control unit 112 may perform the generation process illustrated in FIG. 5 to generate three-dimensional object data.

In addition, the process for generating three-dimensional object data illustrated in FIG. 5 may be performed using hardware such as an application-specific integrated circuit (ASIC). In this case, the process can be performed at higher speed than when the process is performed using software.

Although the program for generating three-dimensional object data is installed on the storage unit 20 in the above exemplary embodiment, the program need not be installed on the storage unit 20. The program for generating three-dimensional object data according to the above exemplary embodiment may be provided using a non-transitory computer readable medium, instead. The program for generating three-dimensional object data in the present disclosure may be provided, for example, using an optical disc such as a compact disc read-only memory (CD-ROM) or a digital versatile disc read-only memory (DVD-ROM) or a semiconductor memory such as a universal serial bus (USB) memory or a memory card. Alternatively, the program for generating three-dimensional object data according to the above exemplary embodiment may be obtained from an external apparatus through a communication line connected to the communication unit 18.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A three-dimensional object forming system comprising:
an object forming apparatus, comprising a discharging head for discharging forming material, that forms a three-dimensional object on a basis of three-dimensional object data; and
an object data generation apparatus,
wherein the object data generation apparatus, comprising a processor, wherein the processor:
obtains a first attribute for each of a plurality of first voxels of the three-dimensional object data;
obtains a plurality of second attributes achievable by the object forming apparatus from the object forming apparatus, wherein the first attribute belongs to a first type and the plurality of second attributes belong to a second type, and the first type and second type are the same;
determines whether the first attribute is different from each of the plurality of second attributes;
replaces the each of the plurality of first voxels with a plurality of second voxels in response to determining the first attribute is different from the each of the plurality of second attributes; and
sets the plurality of second attributes to the plurality of second voxels so that the plurality of second attributes appears the same as the first attribute.

2. The three-dimensional object forming system according to claim 1,
wherein the plurality of second attributes are different from one another.

3. The three-dimensional object forming system according to claim 2,
wherein size of a voxel group including the plurality of second voxels is the same as size of each of the plurality of first voxels.

4. The three-dimensional object forming system according to claim 1,
wherein the processor replaces each of the plurality of first voxels with at least one second voxel and at least one empty voxel.

5. The three-dimensional object forming system according to claim 4,
wherein size of a voxel group including the at least one second voxel and the at least one empty voxel is the same as size of each of the plurality of first voxels.

6. The three-dimensional object forming system according to claim 1,
wherein the first and second types are at least color or hardness.

7. A non-transitory computer readable medium storing a program for generating the three-dimensional object data, the program causing a computer to function as the components of the object data generation apparatus according to claim 1.

* * * * *